Aug. 11, 1964    H. I. F. EVERNDEN    3,143,898
TRANSMISSION
Filed Sept. 18, 1961
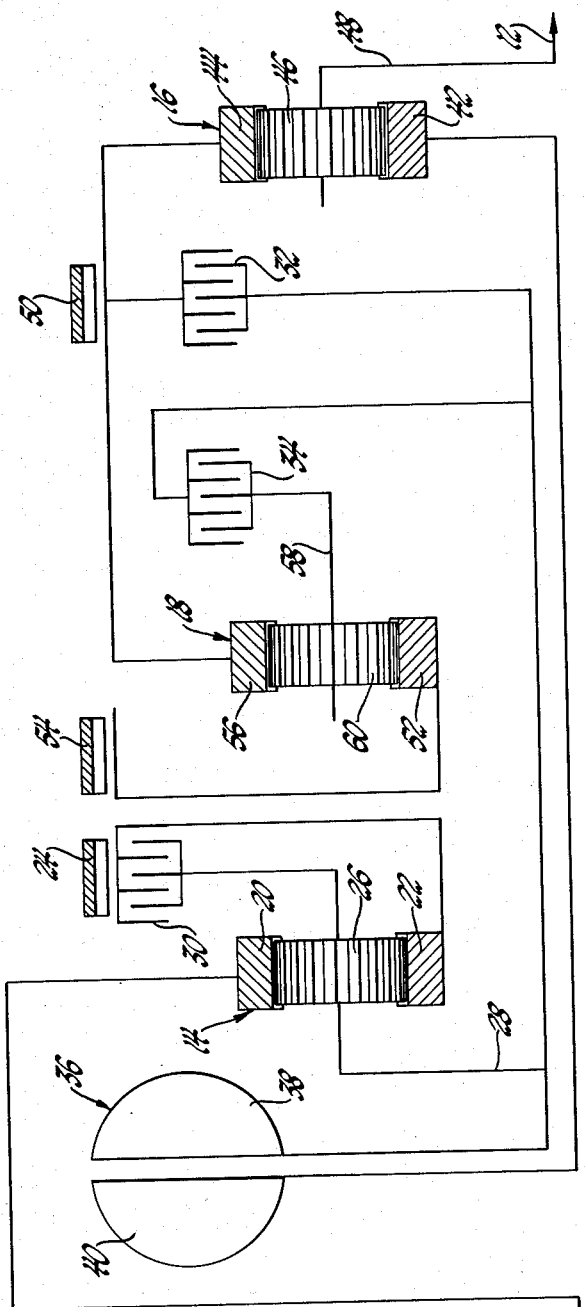
INVENTOR.
Harold I.F. Evernden
BY
Hugh L. Fisher
ATTORNEY

United States Patent Office 3,143,898
Patented Aug. 11, 1964

3,143,898
TRANSMISSION
Harold Ivan F. Evernden, Wistaston, England, assignor to General Motors Corporation, Detroit, Mich., a corporation of Delaware
Filed Sept. 18, 1961, Ser. No. 140,634
Claims priority, application Great Britain Dec. 1, 1960
12 Claims. (Cl. 74—688)

This invention relates to improvements in power transmissions adapted, although not exclusively, for use with motor vehicles.

Overdrives for transmissions when added as an auxiliary unit generally must be conditioned for a direct drive at all times when the overdrive ratio is not wanted. This requires that the overdrive be capable of transmitting the maximum torques occurring in the lowest forward drive and reverse drive ratios. Necessarily this increases the dimensions of the overdrive unless resort is made to a complex compounding arrangement. Also, the ratio obtainable is very often determined by the space made available for installing the overdrive.

For example, with planetary gearing, the minimum diameter of the sun gear will be determined by the shaft on which the sun gear must be mounted. And of course the maximum diameter of the ring gear is determined by the minimum road clearance permitted, assuming the transmission is mounted beneath the floor board of the vehicle body.

If the transmission is mounted elsewhere, any increase in the diameter of the ring gear will still require that the transmission casing size be increased. To overcome this problem, an overdrive gear unit can be installed in one of the plural power paths to a combining type gear unit so that the over-all ratio can be made more advantageous for the particular application of the transmission. However, when the overdrive gear unit is installed in this way in one of the plural power paths, one of the members of the overdrive unit can be driven at an excessive speed whenever the overdrive unit is inoperative such that wear is a concern as well as noise and the substantial inertia effects and their influence on the transmission operation.

With the foregoing in mind, the invention seeks to provide a unique way for deactivating an overdrive gear unit during times when the overdrive ratio is not desired.

More specifically stated, the invention contemplates a novel power transmitting arrangement in which an overdrive gear unit is installed in one of the plural power paths so as to achieve a more optimum ratio. When the overdrive ratio is not wanted, the novel arrangement causes the overdrive gear unit to be withdrawn from the power path so that no element thereof is driven at any excessive speed.

According to the invention, when a planetary type overdrive gear unit would normally be driven but is ineffective due to the lack of reaction, the drive connection is interrupted so that none of the elements thereof can be driven at an excessive speed while the transmission is conditioned for a ratio other than overdrive. In effect, the overdrive gear unit is bypassed at those times when not in use.

The foregoing and other objects and advantages of the invention will be apparent from the following description and from the accompanying drawing in which the single figure shows a schematic view of a transmission incorporating the principles of the invention.

Referring now to the drawing in detail, the numerals 10 and 12 denote respectively a power shaft and a load power shaft that may be drive connected respectively to a vehicle engine and to vehicle wheels in any known way. The load shaft 12 is driven in a plurality of drive ratios through the utilization of a series of planetary gear units including a drive or a torque dividing front gear unit 14, a drive or torque combining rear gear unit 16, and an overdrive gear unit 18. Any suitable reverse gear unit may be provided if a reverse drive ratio is also wanted.

The front gear unit 14 includes a ring gear 20 drive connected to the power shaft 10 and a reaction sun gear 22 that may be restrained from rotation by a brake 24 of a band, disk, cone, or other known type. The ring and sun gears 22 intermesh with one or more planet pinions 26 revolvably supported by an output planet carrier 28. With the front unit brake 24 engaged, the carrier 28 will be driven in the same direction as the input ring gear 20 but at a reduced speed relative thereto. If a direct drive is wanted, a clutch 30 may be employed to join the sun gear 22 and the carrier 28 so that there is no relative motion between elements of the gear unit 14. The clutch 30 can, of course, join the ring and sun gears 20 and 22 or the ring gear 20 and the carrier 28, if preferred.

Drive from the front unit planet carrier 28 proceeds along two paths, one extending directly to the rear gear unit 16 via a rear unit clutch 32 or through the overdrive gear unit 18 via an overdrive clutch 34 and the other through a hydrodynamic torque transmitting device such as a fluid coupling 36. The fluid coupling 36 has an impeller 38 joined to the front unit carrier 28 and a turbine 40 drive connected to the rear unit 16. The fluid coupling 36 operates in a known fashion to cause drive to be transmitted from the impeller 38 to the turbine 40 through the medium of a fluid being transferred therebetween.

In the rear gear unit 16, the drive if from the coupling 36 is to a sun gear 42 or the drive if via the overdrive gear unit 18 or the gear unit clutch 32 is to the reaction ring gear 44. The rear unit sun and ring gears 42 and 44 both mesh with one or more planet pinions 46 revolvably supported on an output planet carrier 48. The output planet carrier 48 is in turn connected to the load shaft 12. By resisting rotation of the rear unit reaction ring gear 44 through the agency of a brake 50, which may be similar to the front unit brake 24, an underdrive is produced by the rear gear unit 16. If, on the other hand, a direct drive is desired, the rear unit clutch 32 is engaged. This direct drive will be further explained in the operational summary.

As has been mentioned, the overdrive gear unit 18 is installed in the power path extending to the rear unit ring gear 44. This, as will be apparent, enables the ratio obtainable from the overdrive gear unit 18 alone to be increased. The overdrive gear unit has a reaction sun gear 52 arranged so as to be prevented from rotation by a brake 54, which may be similar to the front and rear gear unit brakes 24 and 50. The overdrive gear unit also has a ring gear 56 joined to the rear gear unit reaction ring gear 44 and a planet carrier 58 on which one or more planet pinions 60 are revolvably supported. These planet pinions 60 mesh with both of the gears 52 and 56. Drive is transferred to the carrier 58 through a clutch 34 for reasons to be explained.

The transmission is capable of providing at least six forward drive ratios. The first drive ratio, which affords the highest torque multiplication, requires that both the front and rear gear units 14 and 16 be conditioned for reduced drive. Therefore, both the front unit and rear unit brakes 24 and 50 are engaged and the fluid coupling 36 is effected since a fluid start is required. Drive under these conditions proceeds from the power shaft 10 to the front unit ring gear 20 and then to the front unit carrier 28. From this point, the drive at a reduced speed is transferred through the fluid coupling 36 and to the rear unit sun gear 42. Since the rear unit reaction ring gear 44 is maintained stationary and cannot be revolved rearwardly, the rear unit carrier 48 and accordingly the load shaft 12 are revolved at a reduced speed determined by both of the front and rear gear unit ratios.

In the next ratio, the second drive ratio, the front gear unit 14 is locked up for direct drive by engaging the front unit clutch 30. Hence, the rear unit sun gear 42 is revolved at substantially the same speed as the power shaft 10, a slight difference being due to the inherent slippage through the fluid coupling 36. The second drive ratio is therefore determined entirely by the ratio of the rear gear unit 16.

To establish the third drive ratio, a "double transition" shift must take place since the front gear unit 14 is now changed back to an underdrive status with the front gear unit brake 24 reengaged and the rear gear unit 16 is conditioned for a direct drive by the engagement of the rear gear unit clutch 32, the rear gear unit brake 50 being disengaged. With the front and rear gear units 14 and 16 having these statuses, the reduced drive from the front gear unit 14, i.e., the front gear unit carrier 28 is revolved at a reduced speed relative to the power shaft 10, is transferred via two paths, one path being through the fluid coupling 36 and to the rear gear unit input sun gear 42 and the other path through the rear gear unit clutch 32 and to the rear gear unit reaction ring gear 34. Consequently, one part of the drive is mechanical, that is, the drive to the rear gear unit ring 44; whereas the portion of the drive proceeding through the fluid coupling 36 may be considered hydraulic. By splitting the drive in this manner, the effect of the fluid losses through the fluid coupling 36 in the higher ratios upon the overall result are reduced. The rear gear unit 16 therefore is driven in a substantially one-to-one ratio except for the influence of the fluid coupling 36 and the load shaft 12 is revolved in a ratio determined only by the front gear unit 14. The fourth drive ratio requires that the overdrive brake 54 be engaged along with the overdrive clutch 34 while the rear unit clutch 32 is disengaged. The power path formerly proceeding through the rear unit clutch 32 now extends through the overdrive clutch 34 and the overdrive gear unit 18. As a result, the rear unit ring gear 44 is driven at a faster speed than the rear unit sun gear 42. The speed at which the load shaft 12 is driven will be, of course, determined by the drive ratios of the different gear units involved, but would be between the third drive ratio and a direct drive. The operation of the overdrive unit 18 will be described in greater detail during the explanation of the sixth drive ratio.

Fifth speed is a direct drive in which the front unit clutch 30 is engaged to lock up the front gear unit 14 and the rear gear unit clutch 32 is engaged to cause along with the fluid coupling 36 the rear gear unit 16 to be conditioned for a unitary drive. Consequently, the load shaft 12 will be driven at substantially the same speed as the power shaft 10.

The sixth drive ratio is an overdrive and requires that the direct drive condition of the front gear unit 14 be maintained and the overdrive gear unit 18 be rendered effective. Therefore, the rear gear unit clutch 32 is disengaged and both the overdrive brake 54 and the overdrive clutch 34 are engaged. As in the fourth drive ratio, the rear gear unit ring gear 44 will be overdriven and the rear unit sun gear 42 driven at approximately the speed of the power shaft 10. This will produce an overdrive ratio that is slightly higher than that obtainable from the overdrive gear unit 18 alone.

For example, if the overdrive gear unit 18 is proportioned so that the ring gear 56 has twice as many teeth as the sun gear 52, the overdrive unit carrier 58 will be making .66 revolution while the ring gear 56 is making one. If it is desired to increase this overdrive ratio so that it approaches one, either the diameter of the sun gear 52 must be decreased or the diameter of the ring gear 56 increased, or both. Since increasing the size of the ring gear 56 likewise will increase the size of the transmission casing, and decreasing the size of the sun gear 52 may be restricted by the diameter of the shaft on which the sun gear 52 is installed, the insertion of the overdrive unit 18 into one of the power paths to the rear gear unit 16 offers significant advantages. The overdrive ratio developed from the two gear units 16 and 18 will be determined by the formula:

$$\frac{1}{1+\frac{N_{52}}{N_{56}}\times\frac{N_{44}}{N_{44}+N_{42}}}$$

where $N_{56}$ is the number of teeth on ring gear 56; $N_{52}$, the number of teeth on the sun gear 52; $N_{44}$, the number of teeth on the rear unit ring gear 44; and $N_{42}$ the number of teeth on the rear unit sun gear 42.

With the $N_{56}$ being 60 teeth; $N_{52}$, 30 teeth; $N_{44}$, 67 teeth; and $N_{42}$ 41 teeth, the application of the formula will result in a ratio of .77, whereas the overdrive unit 18 alone is only capable of producing a .66 ratio. By the arrangement, a higher overdrive ratio is obtained without altering any of the gear diameters.

If, during the times when the overdrive gear unit 18 is not used and the rear gear unit brake 50 is engaged, the overdrive carrier 58 is maintained in direct connection with the front gear unit carrier 28, the overdrive unit sun gear 52 will overspeed the carrier 58 at exceedingly high rates. For instance, assuming that the prior mentioned proportions are maintained, that is, that the overdrive ring gear 56 has twice as many teeth as the overdrive unit sun gear 52, the overdrive unit sun gear 52 would be caused to revolve at three times the speed of the planet carrier 58. This not only produces wear but also objectionable noises can develop due to the vibrations and the inertia effects can be substantial. This objectionable condition is avoided by disengaging the overdrive clutch 34 at times when the rear unit brake 50 is engaged. When the clutch 34 is disengaged, there will be no drive to the overdrive unit carrier 58, and hence, the overdrive sun gear 52 will not revolve unless there is a slight amount of clutch drag.

From the forgoing it will be appreciated that at no time do the higher torques in the lower drive ratios go through the overdrive unit 18. In fact, only a proportion proceeds therethrough when effective in the fourth and sixth drive ratios. Moreover, all of the advantages of an overdrive are obtained and the disadvantage of having one member thereof revolving at exceedingly high speeds is overcome by the foregoing provision and without resort to any complex structure.

The invention is to be limited only by the following claims.

I claim:

1. In combination, a plural input gear unit having an output connected to a load, an overdrive gear unit having a predetermined overdrive ratio output and means selectively establishing drive from the output of the overdrive gear unit to one of the inputs so as to cause the load output to be overdriven relative to said other inputs in a ratio that is different from the predetermined overdrive ratio output provided by the overdrive gear unit alone.

2. In combination, an overdrive planetary gear unit operative to provide a predetermined overdrive ratio output, a plural input gear unit having power paths to each of the plural inputs, and a load output, and means causing the overdrive planetary gear unit output to be inserted into one of the paths so as to cause the gear unit load output to be driven in an overdrive ratio relative to said other inputs that is different from a predetermined overdrive ratio output provided by the overdrive planetary gear unit alone.

3. In combination, an overdrive planetary gear unit having an input element, an output element, and a reactor for rendering the overdrive gear unit operative, a plural input gear unit having power paths to each of the plural inputs and an output, the output element of said overdrive gear unit being connected to one of said inputs, means inserting the overdrive gear unit into one of the power paths, the inserting means including a clutch for connecting the input element of the overdrive unit to the one power path and thereby cause the plural input gear unit output to be overdriven relative to said other input in a ratio that is different from the overdrive ratio provided by the overdrive planetary gear unit alone.

4. In combination, power means, load means, a combining gear unit having plural inputs each adapted to be drive connected to the power means, and an output drive connected to the load means, an overdrive planetary gear unit having an input and an output, means selectively inserting the overdrive gear unit between the power means and one of the inputs with the input of the overdrive gear unit connected to said power means and the output of the overdrive gear unit connected to said one input so as to cause the output of the combining gear unit to be driven in an overdrive ratio relative to another input of said combining gear unit that is different from the overdrive ratio produced by the overdrive gear unit alone.

5. In combination, power means, load means, an overdrive planetary gear unit having an input planet carrier, an output gear, and a reaction gear for rendering the overdrive gear unit operative to provide a predetermined overdrive ratio, clutch means selectively operative to join the input planet carrier to the power source, and a plural input gear unit including an input gear drive connected to the power means, an input gear drive connected to the overdrive gear unit output gear, and an output planet carrier drive connected to the load means, the output planet carrier having a planet pinion journaled thereon intermeshing with the plural input gear unit input gears, the gear units combining, when the overdrive gear unit and clutch means are operative, to produce an overdrive ratio relative to the input gear connected to the power means that is different from the overdrive ratio provided by the overdrive planetary gear unit alone.

6. In combination, power means, load means, an overdrive planetary gear unit comprising a reaction sun gear, an output ring gear, and an input planet carrier having a planet pinion journaled thereon so as to intermesh with the ring and sun gears, clutch means joining the input planet carrier to the power means, and a plural input planetary gear unit including an input sun gear drive connected to the power means, an input ring gear drive connected to the overdrive gear unit output ring gear, and an output planet carrier drive connected to the load means, the output planet carrier having a planet pinion journaled thereon so as to intermesh with the plural input planetary gear unit ring and sun gears, the two gear units coacting so as to produce together an overdrive ratio that is greater than the overdrive ratio provided by the overdrive planetary gear unit alone.

7. In a transmission, the combination of power means, a load means, a plurality of gear units transferring drive between the power and load means in a series of drive ratios, the gear units including gear unit drive connected to the power means and having an output divisible into plural power paths, a drive combining planetary gear unit drive connected to the load means, and an overdrive gear unit operative to provide a predetermined overdrive ratio, plural power paths between said first recited gear unit and said drive combining planetary gear unit, and means causing the overdrive gear unit to be inserted in one of the power paths with the output of the overdrive gear unit connected to an input of the drive combining gear unit so as to cause the load to be driven in a ratio relative to another input of the drive combining gear unit different from the predetermined overdrive ratio from the overdrive gear unit alone.

8. In a power transmission, the combination of a power source, a load, a plurality of planetary gear units transferring drive between the power source and a load in a series of drive ratios, the planetary gear units including a gear drive connected to the power source and having an output divisible into plural power paths, a drive combining planetary gear unit drive connected to the load, and an overdrive gear unit having a predetermined overdrive ratio, plural power paths between said first recited gear unit and said drive combining planetary gear unit, and clutch means operative to cause the overdrive gear unit to be inserted in one of the power paths with the output of the overdrive gear unit connected to an input of the drive combining gear unit so as to cause the load to be overdriven in a ratio relative to another input of the drive combining gear unit different from the predetermined ratio derived from the overdrive unit alone.

9. In a power transmission; the combination of a power source, a load; a first planetary gear unit having an input drive connected to the power source and an output; a second drive combining planetary gear unit having plural inputs and an output drive connected to the load; plural power paths extending between the first gear unit output and the second gear unit inputs, clutch drive transmitting means disposed in one of the power paths, and an overdrive gear unit arranged in another of the power paths with the output of the overdrive gear unit connected to an input of the drive combining gear unit, and means selectively causing drive to be transferred through the overdrive gear unit so that, with the overdrive gear unit operative and drive also proceeding through the drive transmitting means, the load is overdriven in a ratio relative to the input of the second gear unit driven by another power path different from that provided by the overdrive gear unit alone.

10. In a power transmission; the combination of a power source; a load; a first planetary gear unit having an input drive connected to the power source, a reactor and an output; a second planetary gear unit including an input, a reactor, and an output drive connected to the load; a hydrodynamic torque transmitting device disposed between the first gear unit output and a second gear unit input; an overdrive gear unit including an input, a reactor, and an output drive connected to the second gear unit reactor; and clutch means joining the overdrive gear unit input to the first gear unit output so as to cause, when the overdrive gear unit is effective, the load to be driven in an overdrive ratio relative to said second gear unit input different from the ratio provided by the overdrive gear unit alone with drive proceeding both through the overdrive gear unit to the reactor of the second gear unit and also to the input of the second gear unit.

11. In a power transmission; the combination of a power source, a load, a first planetary gear unit including an input gear drive connected to the power source, a reaction gear, and an output planet carrier having a planet pinion journaled thereon so as to intermesh with the input and reaction gears; a second planetary gear unit comprising an input gear, a reaction gear, and an output planet carrier drive connected to the load and having a planet pinion journaled thereon so as to intermesh with the input and reaction gears; ratio changing mechanism for conditioning the first and second planetary gearing for different drive ratios, the ratio changing mechanism for each gear unit including a brake holding the reaction gear so as to provide one drive ratio therethrough and clutch means causing the gear unit to be conditioned for substantially direct drive ratio; a hydrodynamic torque transmitting device drivingly interposed between the first planetary gear unit output carrier and a second planetary gear unit input gear; an overdrive planetary gear unit including a reaction gear, an output gear drive connected to the second gear unit reaction gear, and a planet carrier having a planet pinion journaled thereon so as to intermesh with the reaction and output gears, clutch means selectively joining the overdrive planetary gear unit input carrier to the first gear unit output carrier, and an overdrive brake holding the overdrive reaction gear so that with the first gear unit conditioned for one drive ratio, the second clutch means inoperative, and the overdrive gear unit clutch means operative, the load is driven in a ratio determined by portions of the drive delivered to the second gear unit input and reaction gears respectively by way of the hydrodynamic torque transmitting device and the overdrive gear unit.

12. In a power transmission; the combination of a power source; a load; a first planetary gear unit including a ring gear drive connected to the power source, a reaction sun gear, an output planet carrier having a planet pinion journaled thereon so as to intermesh with the ring and sun gears, a first gear unit brake resisting rotation of the first gear unit sun gear in one direction so as to provide a reduced drive ratio therethrough, and a first gear unit clutch joining together the first gear unit carrier and sun gear so as to provide a direct drive ratio therethrough; a second planetary gear unit including an input sun gear, a reaction ring gear, an output planet carrier drive connected to the load and having a planet pinion journaled thereon so as to intermesh with the second gear unit input sun and reaction ring gears, a second gear unit brake preventing rotation of the second gear unit reaction ring gear in one direction so as to provide a reduced drive ratio therethrough, and a second gear unit clutch joining the second gear unit reaction ring gear to the first gear unit output planet carrier; a fluid coupling drivingly interposed between the first gear unit output planet carrier and the second gear unit input sun gear; and an overdrive planetary gear unit including an input planet carrier, a reaction sun gear, an output ring gear drive connected to the second gear unit reaction ring gear, the overdrive planet carrier having a planet pinion journaled thereon so as to intermesh with the overdrive gear unit ring and sun gears, an overdrive brake holding the overdrive gear unit reaction sun gear, and an overdrive clutch joining together the overdrive gear unit input planet carrier and the first gear unit output carrier so that, with the overdrive brake operative and the second gear unit clutch inoperative, the load is driven at a greater overdrive ratio than that obtained from the overdrive gear unit alone.

References Cited in the file of this patent

UNITED STATES PATENTS

| | | |
|---|---|---|
| 2,736,407 | Smirl | Feb. 28, 1956 |
| 2,764,904 | Kummich | Oct. 2, 1956 |
| 2,829,542 | Swennes | Apr. 8, 1958 |
| 2,911,853 | Sand | Nov. 10, 1959 |
| 3,097,544 | Evernden | July 16, 1963 |

UNITED STATES PATENT OFFICE
CERTIFICATE OF CORRECTION

Patent No. 3,143,898                          August 11, 1964

Harold Ivan F. Evernden

It is hereby certified that error appears in the above numbered patent requiring correction and that the said Letters Patent should read as corrected below.

Column 6, line 25, strike out "clutch".

Signed and sealed this 24th day of November 1964.

(SEAL)
Attest:

ERNEST W. SWIDER
Attesting Officer

EDWARD J. BRENNER
Commissioner of Patents